US006929085B2

(12) United States Patent
Sugitani (10) Patent No.: US 6,929,085 B2
(45) Date of Patent: Aug. 16, 2005

(54) STEERING APPARATUS FOR VEHICLE

(75) Inventor: Nobuo Sugitani, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/864,984

(22) Filed: Jun. 10, 2004

(65) Prior Publication Data

US 2004/0256171 A1 Dec. 23, 2004

(30) Foreign Application Priority Data

Jun. 18, 2003 (JP) .......................................... 2003-173425

(51) Int. Cl.[7] ............................................... B62D 5/06
(52) U.S. Cl. ...................... 180/402; 180/444; 180/446
(58) Field of Search ................................. 180/402, 403, 180/443, 444, 446; 701/41, 42

(56) References Cited

U.S. PATENT DOCUMENTS

| 6,634,454 | B2 | * | 10/2003 | Sugitani et al. | ............. | 180/402 |
| 6,719,088 | B2 | * | 4/2004 | Nakano et al. | ............. | 180/402 |
| 2001/0032748 | A1 | * | 10/2001 | Demerly | .................... | 180/402 |
| 2004/0133321 | A1 | * | 7/2004 | Ghoneim et al. | ............. | 701/41 |

FOREIGN PATENT DOCUMENTS

| JP | 10-217998 | 8/1998 |
| JP | 2002-160642 | 6/2002 |

* cited by examiner

*Primary Examiner*—Tony Winner
(74) *Attorney, Agent, or Firm*—Merchant & Gould P.C.

(57) ABSTRACT

A steering apparatus for a vehicle includes an operating lever, an operating amount sensor that detects the operating amount of the operating lever, an operating reaction force motor that imparts an operating reaction force to the operating lever, a steering mechanism section that steers a steered wheel of a vehicle, a rack position sensor that detects the steered amount of the steered wheel, an operating torque sensor that detects an operating torque, and a control device that determines the control amount for the operating reaction force motor and the control amount for the steering mechanism section in accordance with a deviation between the above operating amount and the above steered amount. The control device includes a feedforward control device that feedforward-controls the steering mechanism section in accordance with the operating torque, and a band-pass filter that increases or decreases the feedforward effect in accordance with the operating frequency. By adjusting the feedforward effect with the band-pass filter in accordance with the operating frequency of the operating element, the responsiveness can be adjusted.

5 Claims, 8 Drawing Sheets

STEERING APPARATUS FOR VEHICLE

BACKGROUND OF THE INVENTION

1. Field of the Invention

The present invention relates to a steering apparatus for a vehicle.

Priority is claimed on Japanese Patent Application No. 2003-173425, filed Jun. 18, 2003, the content of which is incorporated herein by reference.

2. Description of Related Art

A steering apparatus for a vehicle of a steer-by-wire system (hereinafter referred to as the SBW apparatus) is known in which the steering axis coupled to the steering wheel is mechanically separated from the steering mechanism that steers the steered wheel, and the steering motor provided in the steering mechanism is electrically controlled.

In this SBW apparatus, the target value for the steering angle of a steered wheel is calculated based on the operating amount which the vehicle driver gives to the steering wheel, and the steering motor is feedback-controlled in accordance with the target value so as to control the steering angle of the steered wheel.

This feedback control is basically a position control in which the actual value is made to follow the target value, and the steady-state deviation between the target value and the actual value is generally reduced by providing the feedback system with an integral control device or the like.

Moreover, because in the SBW apparatus the steering wheel and the steered wheel are mechanically separated from each other, it is practically impossible for a vehicle driver to directly feel through the steering wheel the road surface reaction force that is applied to the steered wheel. In the case in which the road surface information is not transmitted from the steered wheel to the steering wheel, if the steered wheel, for example, bumps against a curb and becomes stuck, the driver, without perceiving it, will continue steering, so that the target value for the steering angle of the steered wheel will become greatly excessive, and the steering motor will undergo an excessive load in an effort to follow the target value. In addition, the vehicle driver may have a feeling that something is wrong when he knows, notwithstanding his turning of the steering wheel, that the steered wheel does not change its direction.

As a means to cope with such a disadvantage, a technique is disclosed in Japanese Patent Application Unexamined Publication No. 10-217998, in which a simulated torque of reaction force is generated by an electric motor or the like in accordance with the deviation between the target control amount corresponding to the rotation angle (operating amount) of the steering wheel and the actual steering angle of the steered wheel, i.e., in accordance with the deviation between the target value and the actual value in the feedback control. The simulated torque of reaction force is applied to the steering wheel to give the vehicle driver feedback sensation.

Another technique is disclosed in Japanese Patent Application Unexamined Publication No. 2002-160642, in which in order to improve the responsiveness in control of the steering angle of the steered wheel, the operating torque that acts on the steering wheel is detected, and the control amount of the steering motor is feedforward-controlled in accordance with the operating torque.

However, in the case the integral control is performed to reduce the steady-state deviation between the target value and the actual value, if the target value and the actual value become equal at a certain steering angle, the operating reaction force based on the deviation will cease to be applied, resulting in the loss of a sensation of steering. This is a characteristic not found in the conventional steering apparatus in which the steering wheel and the steered wheel are mechanically coupled, and will give a very strong sensation that something is wrong to a vehicle driver who is accustomed to driving a conventional vehicle.

The present invention has been made in view of the above problems and it is an object thereof to provide a steering apparatus for a vehicle which enables the operating reaction force to be set as desired, and which enables improvement in the responsiveness.

SUMMARY OF THE INVENTION

In order to attain the above object, according to the present invention, there is provided a steering apparatus for a vehicle comprising: an operating element (for example, an operating lever 11 in the later-described embodiment) with which a driver of a vehicle operates the vehicle; an operating amount detecting device (for example, an operating amount sensor 16 in the later-described embodiment) that detects an operating amount of the operating element; a reaction force imparting device (for example, an operating reaction force motor 19 in the later-described embodiment) that imparts to the operating element an operating reaction force in opposition to an operating direction of the operating element; a steering device (for example, a steering mechanism section 2 in the later-described embodiment) that steers a steered wheel (for example, a steered wheel W in the later-described embodiment) of the vehicle through a rack axis (for example, a rack axis 7 in the later-described embodiment), the steering device being mechanically separated from the operating element; a steered amount detecting device (for example, a rack position sensor 10 in the later-described embodiment) that detects a steered amount of the steered wheel; a target rack position setting device that sets a target rack position of the rack axis based on the operating amount detected by the operating amount detecting device; and a control device (for example, a control device 4 in the later-described embodiment) that determines a control amount for the reaction force imparting device and a control amount for the steering device in accordance with a deviation between the target rack position set by the target rack position setting device and the steered amount detected by the steered amount detecting device, wherein the steering apparatus for a vehicle further comprises an operating torque detecting device (for example, an operating torque sensor 15 in the later-described embodiment) that detects an operating torque acting on the operating element, and the control device comprises a feedforward control device (for example, an FF control device 37 in an embodiment described below) that feedforward-controls the steering device in accordance with the operating torque detected by the operating torque detecting device; and a frequency compensating device (for example, a band-pass filter 38 in an embodiment described below) that increases or decreases a feedforward effect in accordance with an operating frequency of the operating element.

With the construction as described above, by adjusting the FF effect with the frequency compensating device in accordance with the operating frequency of the operating element, the responsiveness can be adjusted. For example, if the FF gain is made large when the operating frequency is high, the responsiveness is improved.

Preferably, in the steering apparatus for a vehicle as described above, the control device further comprises an integral control device (for example, a variable integral control device 34 in the later-described embodiment) that increases or decreases an integral effect in control of the steering device in accordance with at least a road surface condition.

With the construction as described above, the operating reaction force can be adjusted by adjusting the integral effect with the integral control device in accordance with the road surface condition. For example, if the integral gain is reduced for the low $\mu$ road, the steady state deviation increases, with the result that the operating reaction force is increased and the steering stability is improved, while if the integral gain is increased for the high $\mu$ road, the steady state deviation decreases, with the result that the operating reaction force is reduced and the steering smoothness is improved. Note that $\mu$ is intended to mean road surface resistance.

Preferably, in the steering apparatus for a vehicle as described above, the control device further comprises a proportional and differential control device that cooperates with the integral control device to provide a proportional, integral and differential control value for the steering device.

Preferably, in the steering apparatus for a vehicle as described above, the feedforward control device calculates a feedforward control value for feedforward-controlling the steering device by multiplying an original feedforward control value that is determined based on a map of the operating torque detected by the operating torque detecting device and a drive amount of the steering motor, by a feedforward gain set by the frequency compensating device.

Preferably, in the steering apparatus for a vehicle as described above, the control device further comprises a proportional and differential control device that cooperates with the integral control device to provide a proportional, integral and differential control value for the steering device; the feedforward control device calculates a feedforward control value for feedforward-controlling the steering device by multiplying an original feedforward control value that is determined based on a map of the operating torque detected by the operating torque detecting device and a drive amount of the steering motor, by a feedforward gain set by the frequency compensating device; and the proportional, integral and differential control value and the feedforward control value are synthesized to control a drive current for the steering motor.

DETAILED DESCRIPTION OF THE INVENTION

A steering apparatus for a vehicle according to an embodiment of the present invention will now be described with reference to the attached drawings.

Figure 1:
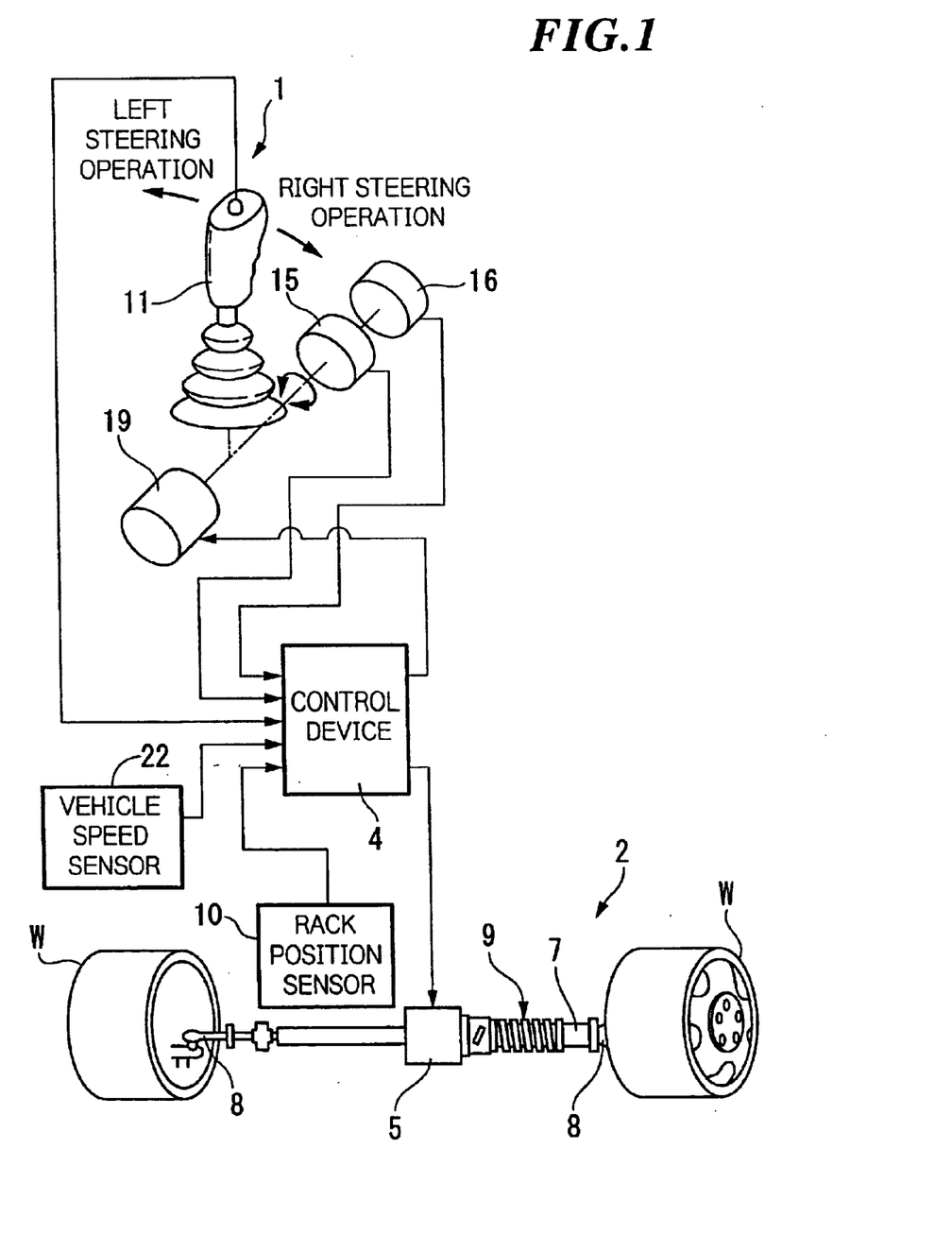
FIG. 1 is a structural view of one embodiment of a steering apparatus for a vehicle according to the present invention.
Figure 2:
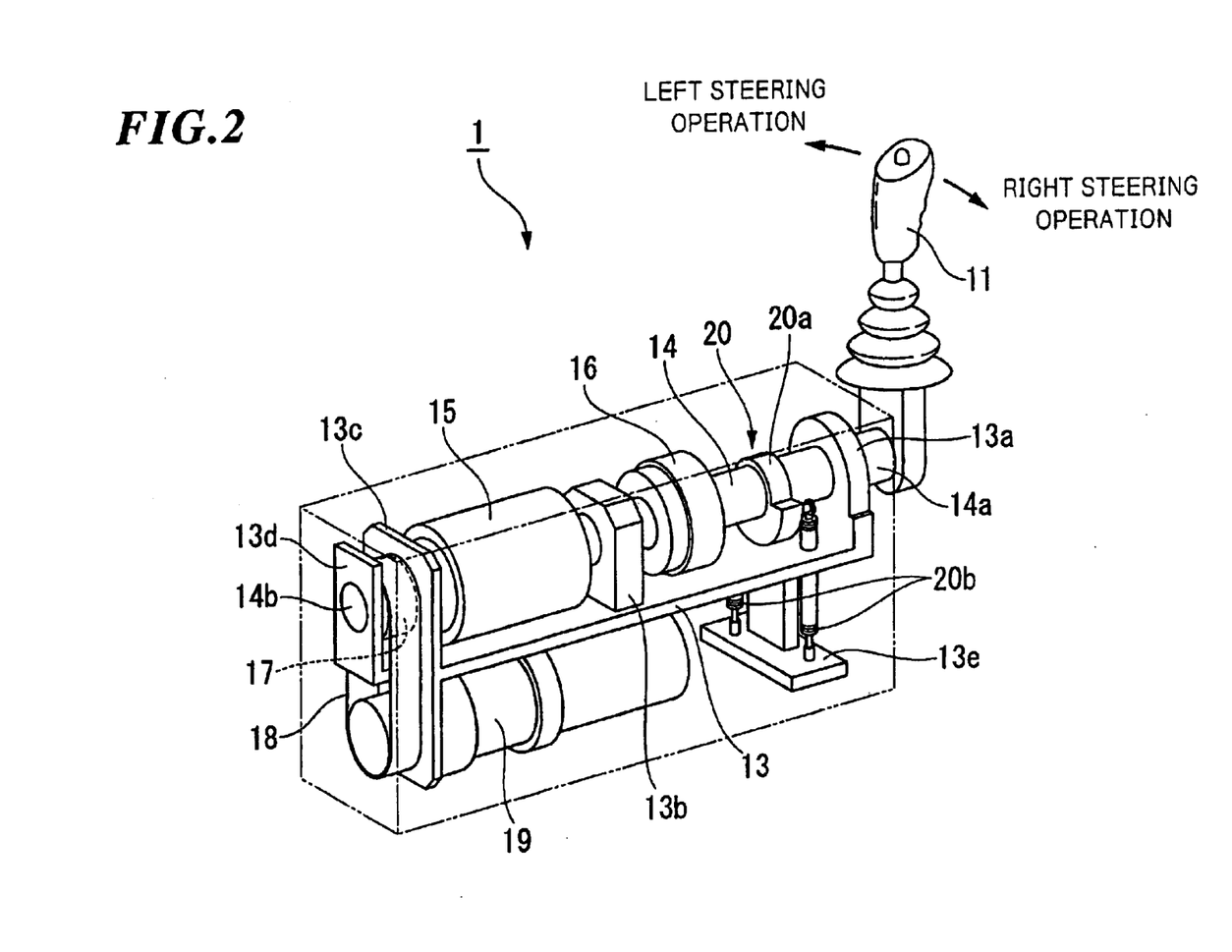
FIG. 2 is a perspective view of an operating section in the above embodiment.

FIG. 1 is a schematic structural view of the steering apparatus for a vehicle according to the present embodiment, and FIG. 2 is a perspective view of an operating lever shown in FIG. 1.

The steering apparatus for a vehicle as shown in FIG. 1 is a steering apparatus of the so-called steer-by-wire system, in which by operating an operating lever 11 of an operating section 1 to the left or right, a steering mechanism section 2, which is mechanically separated from the operating section 1, is operated through a control device 4. In the steering mechanism section 2, a steering motor 5 is driven by a signal from a control device 4, and the motion of the steering motor 5 is converted into a linear motion of a rack axis 7 by a ball screw mechanism 9 so as to steer steered wheels W and W.

The operating section 1 mainly includes the operating lever 11 which the driver of a vehicle operates, an operating torque sensor 15 that detects the operating torque that acts on the operating lever 11, an operating amount sensor 16 that detects a rotation angle (operation amount) of the operating lever 11, and an operating reaction force motor 19 that gives an operating reaction force to the operating lever 11 in accordance with a command from the control device 4. The operating torque sensor 15 outputs an electric signal that corresponds to the operating torque detected to the control device 4, and the operating amount sensor 16 outputs an electric signal that corresponds to the operation amount detected to the control device 4.

On the other hand, the rack axis 7 is provided with a rack position sensor 10 that detects the position of the rack axis 7 (hereinafter often referred to as the rack position), and that outputs an electric signal corresponding to the rack position detected to the control device 4. A known sensor such as a linear encoder, potentiometer or the like that is provided along the rack axis, or a combination of plural sensors is usable as the rack position sensor 10. In the present embodiment, by detecting the rack position, the steered amount of the steered wheels W and W is detected, so that the rack position sensor 10 constitutes a steered amount detecting means.

Furthermore, the vehicle is provided with a speed sensor 22 that outputs an electric signal corresponding to the speed of the vehicle detected to the control device 4.

The steering motor 5, which is driven by a control signal from the control device 4, is coupled to a nut of the ball screw mechanism 9. The screw axis of the ball screw mechanism 9 is formed into the rack axis 7. Consequently, the rotational motion of the steering motor 5 is converted into the linear motion of the rack axis 7 by the ball screw mechanism 9. Moreover, the rack axis 7 is coupled via tie rods 8 and 8 to the steered wheels W and W so that the linear motion of the rack axis 7 is converted into the steering motion of the steered wheels W and W.

Next, the operating section 1 will be described in detail.

As shown in FIG. 2, a rod 14 coupled to the operating lever 11 is rotatably supported on a frame 13 of the operating section 1, and an operating reaction force motor 19 is mounted thereon.

The operating lever 11 is gripped at the top by the driver of the vehicle to be operated, and one end 14a of the rod 14 is fixed to a lower portion of the operating lever 11. The rod 14 is fixed perpendicularly to the operating lever 11 and is rotatably supported via bearings or the like at the walls 13a, 13b, 13c and 13d of the frame 13. As a result, the operating lever 11 can be tilted leftwardly and rightwardly in a rotation-like motion with the rod 14 as an axis. Note that, in the following description, tilting the operating lever 11 to the right with the rod 14 as an axis so that the steered wheels W and W are steered to the right is referred to as the "right steering", and tilting the operating lever 11 to the left with the rod 14 as an axis so that the steered wheels W and W are steered to the left is referred to as the "left steering".

The operating torque sensor 15 and the operating amount sensor 16 are disposed along the longitudinal direction of the rod 14.

Figure 3:
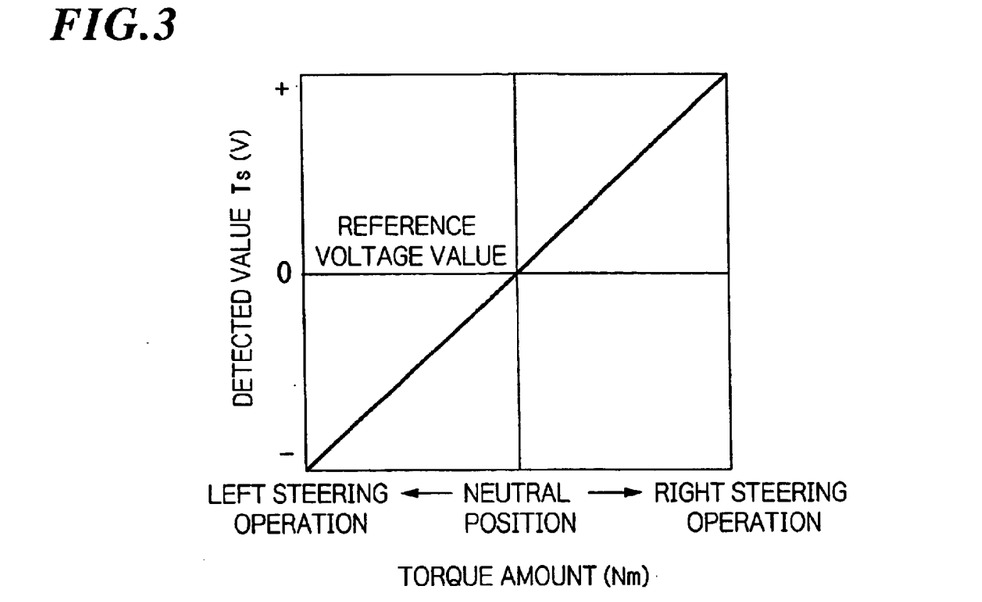
FIG. 3 is an output characteristic diagram of an operating torque sensor in the above embodiment.

The operating torque sensor 15, which is constructed by a known sensor utilizing a strain gage or the like, detects the amount of operating torque that acts on the operating lever 11 and outputs a voltage value (detected value Ts) corresponding to the operating torque amount. The control device 4 processes the output of the operating torque sensor 15 so that a reference voltage value is given as the zero point when the operating lever 11 is in the neutral position, the value (detected value Ts) will be positive when the right steering of the operating lever 11 is performed from the neutral position, and the value (detected value Ts) will be negative when the left steering of the operating lever 11 is performed from the neutral position. As a result, the output characteristic of the operating torque sensor 15 that is recognized by the control device 4 is as shown in FIG. 3. The output (detected value Ts) from the operating torque sensor 15 is used in the feedforward (FF) control which will be described later.

Figure 4:
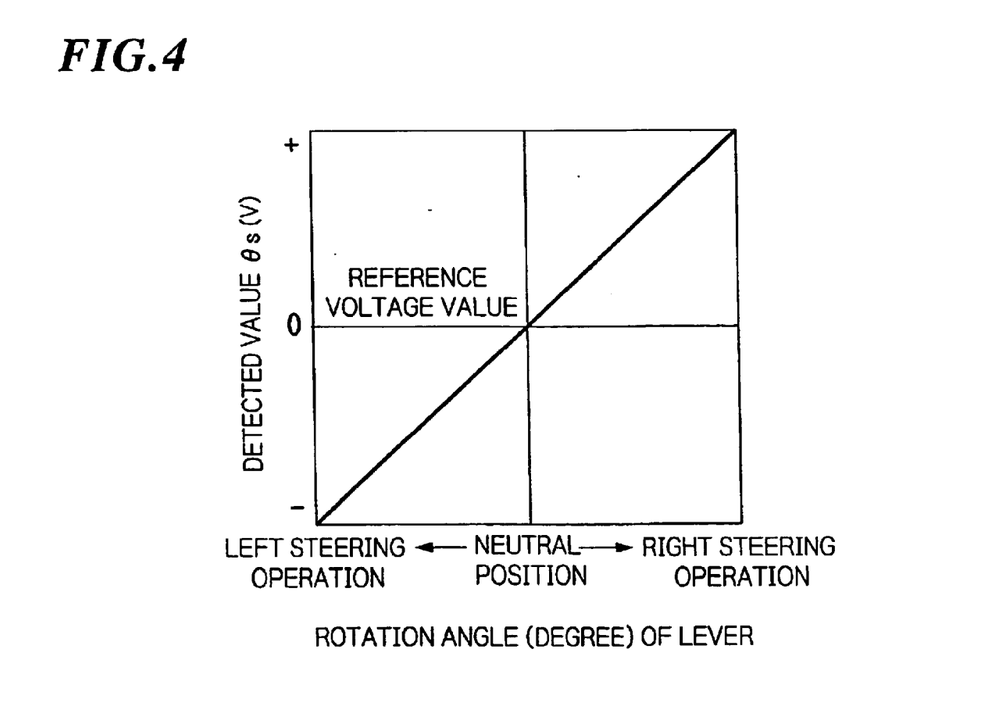
FIG. 4 is an output characteristic diagram of an operating amount sensor in the above embodiment.

The operating amount sensor 16, which is constructed by a potentiometer that detects the angle of rotation of the rod 14 caused by the operation of the operating lever 11, outputs a voltage value (detected value θs) corresponding to the operating amount of the operating lever 11. The control device 4 processes the output of the operating amount sensor 16 in the same manner as the output of the operating torque sensor 15. In other words, as shown in FIG. 4, the output characteristic of the operating amount sensor 16 is such that a reference voltage value is given as the zero point when the operating lever 11 is in the neutral position, the detected value θs increases when torque is applied by the right steering of the operating lever 11, and the detected value θs decreases when torque is reversely applied by the left steering of the operating lever 11.

Furthermore, the rod 14 has a pulley 17 at its other end 14b which is coupled via a belt 18 to the rotation axis of the operating reaction force motor 19.

The operating reaction force motor 19 receives a signal from the control device 4 and cooperates with the centering mechanism 20, described below, to generate a reaction force (operating reaction force) of a predetermined magnitude in a direction opposite to the operating direction of the operating lever 11 according to the operating amount of the operating lever 11 and the vehicle speed, thereby improving the operability of the steering operation.

The centering mechanism 20 is provided on the rod 14 between the operating lever 11 and the operating amount sensor 16, which centering mechanism 20 urges the operating lever 11 back to the neutral position. The centering mechanism 20 is constructed by a plate 20a fixed to the rod 14, and centering springs 20b and 20b latched respectively to opposite left and right ends of the plate 20a. The hook at the lower end of each centering spring 20b is latched to the bottom 13e of the frame 13. Consequently, if the left steering, for example, is performed, the centering spring 20b located toward the viewer in FIG. 2 is stretched to produce a restoring force that causes the spring to return to its original length, thereby urging the operating lever 11 back to the neutral position. Thus, when the operating lever 11 is returned from the leftward tilted position to the neutral position, the restoring force of the centering spring 20b assists the returning of the operating lever 11.

Figure 5:
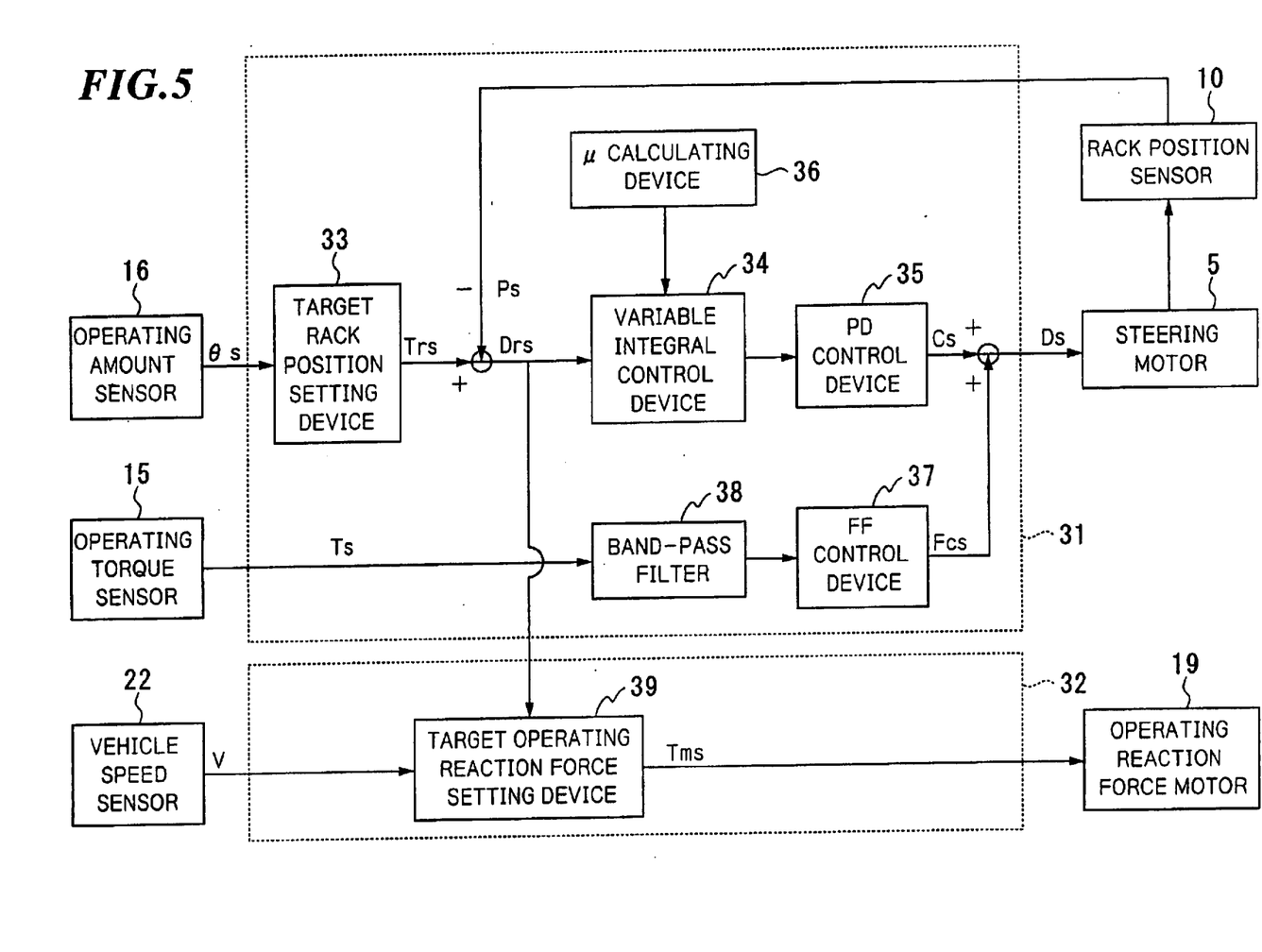
FIG. 5 is a control block diagram of a control device in the above embodiment.

Next, a description of the control device 4 will be made with reference to the control block diagram in FIG. 5.

The control device 4 is constructed by a CPU (Central Processing Unit), ROM (Read Only Memory), RAM (Random Access Memory), and ECU (Electronic Control Unit) including a predetermined electric circuit. The control device 4 includes a steering control section 31 that controls the steering motor 5 based on the value detected by each of the rack position sensor 10, the operating torque sensor 15, and the operating amount sensor 16, as well as an operating reaction force control section 32 that controls the operating reaction force motor 19 based on the value detected by the vehicle sensor 22 and so forth. The control device 4 is capable of controlling the steering motor 5 and the operating reaction force motor 19 independently.

First, the steering control section 31 will be described.

In the steering control section 31, the target value for the rack position that corresponds to the amount of the operation performed by the vehicle driver (hereinafter referred to as the "target rack position") Trs is first set by a target rack position setting device 33 based on the detected value θs of the operation amount detected by the operating amount sensor 16. The target rack position Trs is a position obtained merely from a certain related matter such as the amount proportional to the rotation angle (operation amount) of the operating lever 11.

Next, the deviation Drs between the target rack position Trs and the actual current rack position (hereinafter referred to as the "actual rack position") detected by the rack position sensor 10 is calculated, and if the value of the deviation Drs is positive, it indicates the steering in the rightward direction, while if the value of the deviation Drs is negative, it indicates the steering in the leftward direction. With an ordinary steering apparatus that is not of a steer-by-wire type, this deviation Drs is an amount corresponding to the torsion of a steering axis or the like.

Then, the deviation Drs between the target rack position Trs and the actual rack position Ps is compensated in a predetermined manner by a variable integral control device 34 and a proportional and differential control device (hereinafter abbreviated as the PD control device) 35 so that it is optimized for the running conditions at that time, and a P (Proportional), I (Integral) and D (Differential) control value Cs is calculated for the steering motor 5. Thus, the steering control section 31 improves the tracking performance of the rack axis 7 to the target rack position Trs by having the PID function as mentioned above.

In the case in which the integral control is performed for control of the rack position, if the integral gain Gi is made large and the integral effect is made large, the steady-state deviation can be made small, but on the other hand, the operating reaction force becomes small. In contrast, if the integral gain Gi is made small and the integral effect is made small, the steady-state deviation becomes large, but loss of the operating reaction force can be prevented. It follows from the above that if the integral gain Gi is made large, the steering smoothness is improved, and if the integral gain Gi is made small, the transmitting performance of road surface information is improved and the steering stability is improved.

As a result, in the steering control section 31 of the present embodiment, the variable integral control device 34 is employed for the integral control so that the integral gain Gi is varied in accordance with the road surface resistance $\mu$ calculated in a road surface resistance calculating device (hereinafter abbreviated as the $\mu$ calculating device) 36. The $\mu$ calculating device 36 calculates the road surface resistance $\mu$ of a road based on the vehicle speed, yaw rate, transverse G, rack position and the like.

Figure 6:
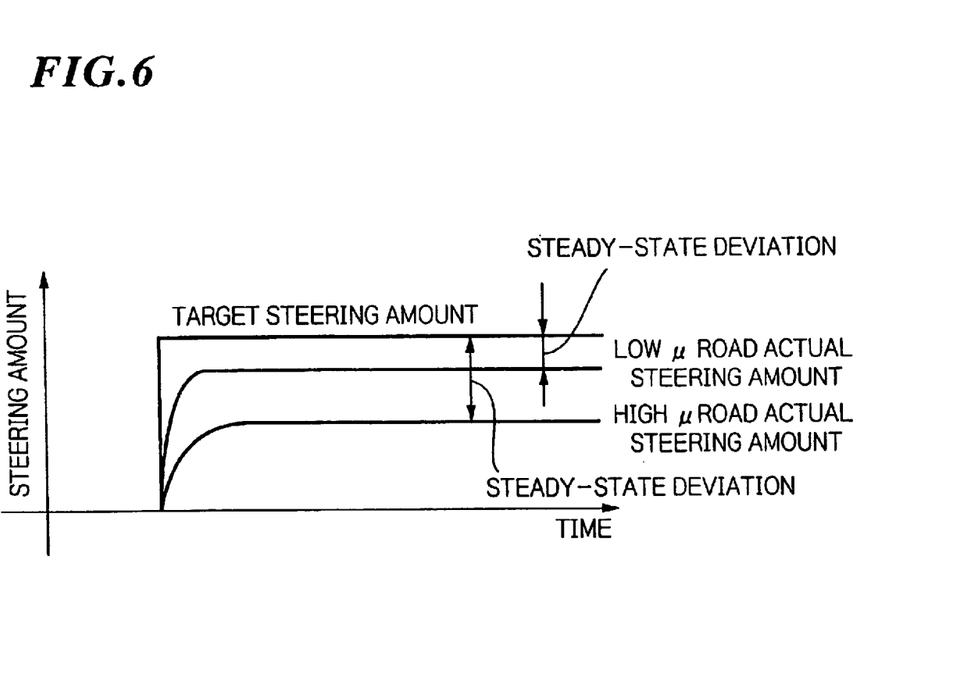
FIG. 6 is an integral gain characteristic diagram of a variable integral control device in the above embodiment.

Especially in the variable integral control device 34 of the present embodiment, as shown in FIG. 6, the integral gain Gi is set to be smaller in the case of the road surface resistance $\mu$ being low than in the case of the road surface resistance It being high so as to provide a large steady-state deviation. As a result, road surface information and a steady feeling of operating reaction force such as is not obtainable with a common vehicle running on a low $\mu$ road can be obtained.

Moreover, it is also possible that, through provision of a mode selection switch that enables, according to the vehicle driver's taste, selection between modes such as, for example, "sports mode", "normal mode", "luxury mode" and the like, the variable integral control device 34 varies the integral gain statically and dynamically in accordance with the mode selected to change the integral effect.

Note that in the present embodiment, the variable integral control device 34 constitutes an integral control device that increases or decreases the integral effect in accordance at least with road surface conditions.

Furthermore, in the steering control section 31, a feedforward control value (hereinafter abbreviated as the FF control value) Fcs for the steering motor 5 is calculated by a feedforward control device 37 based on the torque value Ts detected by the operating torque sensor 15. More specifically, the feedforward control device (hereinafter abbreviated as the FF control device) 37 calculates the FF control value Fcs by multiplying together an original FF control value Fcsp that is determined based on a map of the detected torque value Ts and the drive amount of the steering motor 5 and a feedforward gain (hereinafter abbreviated as the FF gain) Gff set by the band-pass filter 38 which will be described later.

The FF control device 37 thus provided makes it possible for the rack axis 7 to be moved in advance of an increase in the operating amount of the operating lever 11, thereby improving the responsiveness in the steering operation. The operation of the band-pass filter 38 will be described in detail below.

Then, in the steering control section 31, the PID control value Cs and the FF control value Fcs are synthesized to control the drive current of the steering motor 5 in accordance with the synthesized control value Ds (Ds=Cs+Fcs).

Next, the operating reaction force control section 32 will be described.

In the operating reaction force control section 32, the target reaction force that acts on the operating lever 11 is set by a target operating reaction force setting device 39 based on the detected vehicle speed value (hereinafter abbreviated as the vehicle speed) V from the vehicle speed sensor 22 and the deviation Drs calculated in the steering control section 31. More specifically, the target operating reaction force setting device 39 sets the gain Gv in accordance with the vehicle speed V, and calculates the target operating reaction force control value Tms by multiplying together the thus set gain Gv and the deviation Drs.

The drive current for the operating reaction force motor 19 is controlled in accordance with the target operating reaction force control value Tms. By this, an operating reaction force is imparted to the operating section 1.

Note that the gain Gv is set as a function of the vehicle speed V such that it becomes larger as the vehicle speed V increases.

Furthermore, it is also possible for the gain Gv to have a dynamic characteristic relative to the frequency of the deviation Drs.

As described above, in the steering control section 31 of the present embodiment, the integral gain Gi is varied by the variable integral control device 34 in accordance with the road surface resistance $\mu$, making it possible for the operating reaction force to be adjusted in accordance with the road surface condition. In this case, if a deviation lies between the target rack position Trs and the actual rack position Ps, the target operating reaction force setting device 39 sets the operating reaction force and drives the operating reaction force motor 19 in accordance with the set value, resulting in a continuous generation of an operating reaction force. However, if at this time the FF control is concurrently performed by the FF control device 37 based on the operating torque, because the FF control acts in the direction of reducing the deviation, the original object of making the integral gain Gi variable (i.e., adjustment of the operating reaction force in accordance with road surface conditions) becomes unattainable.

As a result, in the present embodiment, the FF gain Gff has been made increaseable or decreaseable by the above-mentioned band-pass filter 38 in accordance with the operating frequency of the operating lever 11 so that the feedforward effect (hereinafter abbreviated as the FF effect) can be varied in accordance with the operating frequency of the operating lever 11. Note that the operating frequency is the operating speed (rotation speed) of the operating lever 11 and can be detected based on its operating amount that is detected by the operating amount sensor 16.

Figure 7:
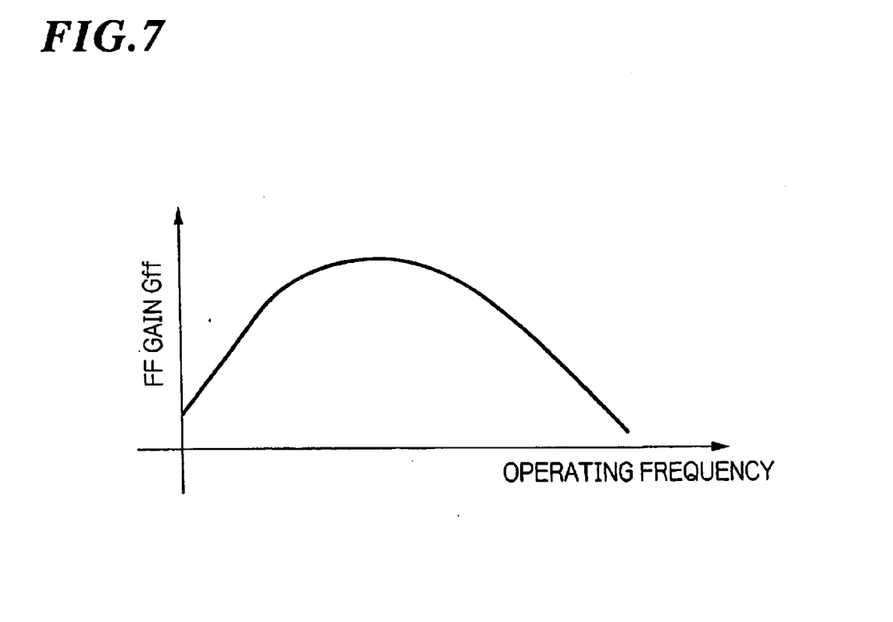
FIG. 7 is an FF gain characteristic diagram of a band-pass filter in the above embodiment.

FIG. 7 shows an example of the FF gain characteristic of the band-pass filter 38. In the FF gain characteristic of this example, the FF gain Gff is made large when the operating frequency is high so that the FF effect becomes large, and the FF gain Gff is made small when the operating frequency is low so that the FF effect is suppressed to be small. If the FF gain characteristic is set in this way, when the operating amount of the operating lever 11 is small, but the operating speed of the operating lever 11 is fast as during the initial stage of operation or the like, the FF effect is made large so that a delay of steering will not be felt, and when the operating speed of the operating lever 11 is slow as during the stage immediately before the termination of operation, the FF effect is made small to secure a deviation Drs between the target rack position Trs and the actual rack position Ps so that an operating reaction force will be felt.

Note that the FF gain characteristic as shown in FIG. 7 is merely an example, and it is also possible to employ an FF gain characteristic other than that shown in this figure.

Figure 8:
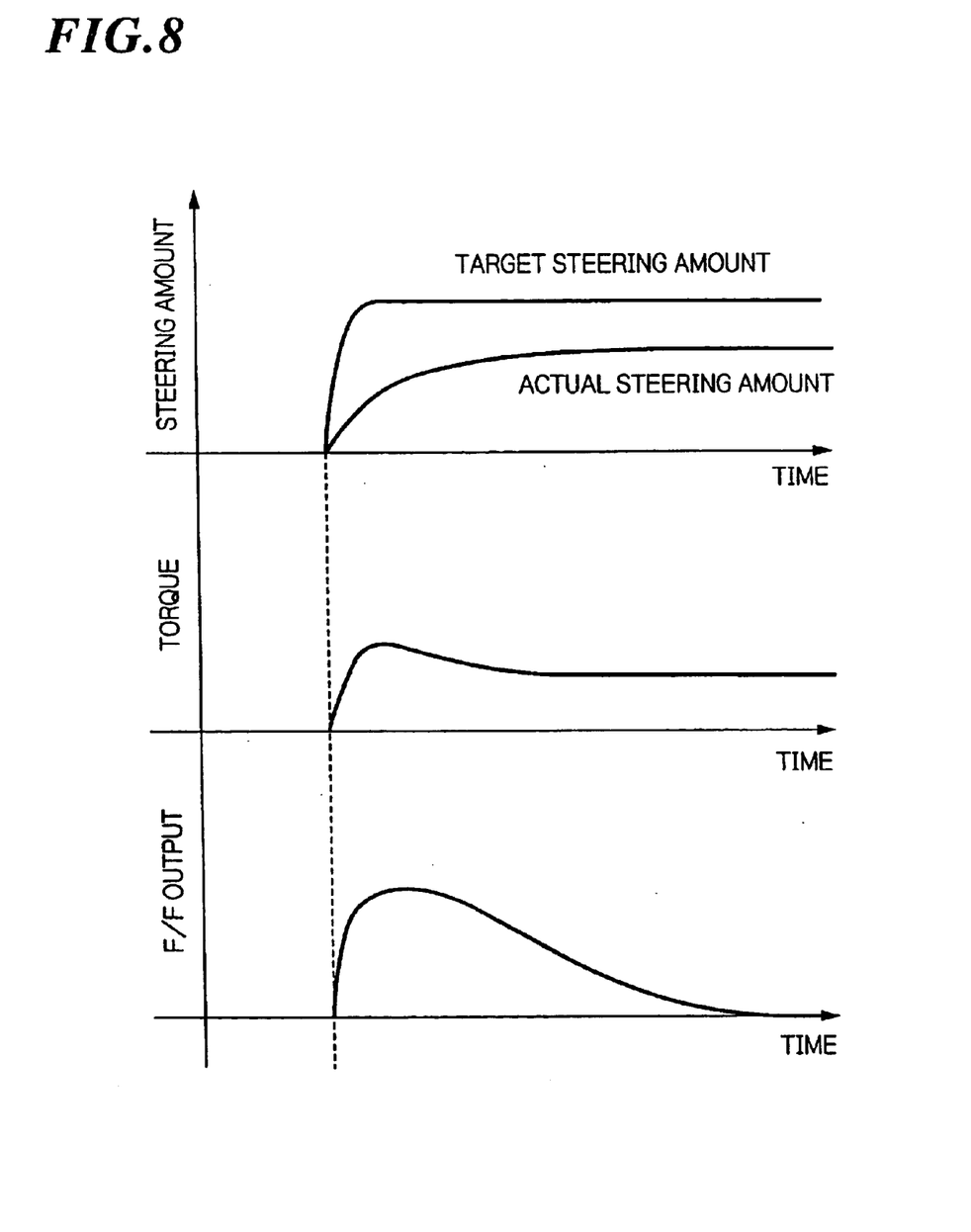
FIG. 8 is a transitional characteristic diagram at the time when rapid steering is performed on a high $\mu$ road with the steering apparatus for a vehicle according to the above embodiment.
Figure 9:
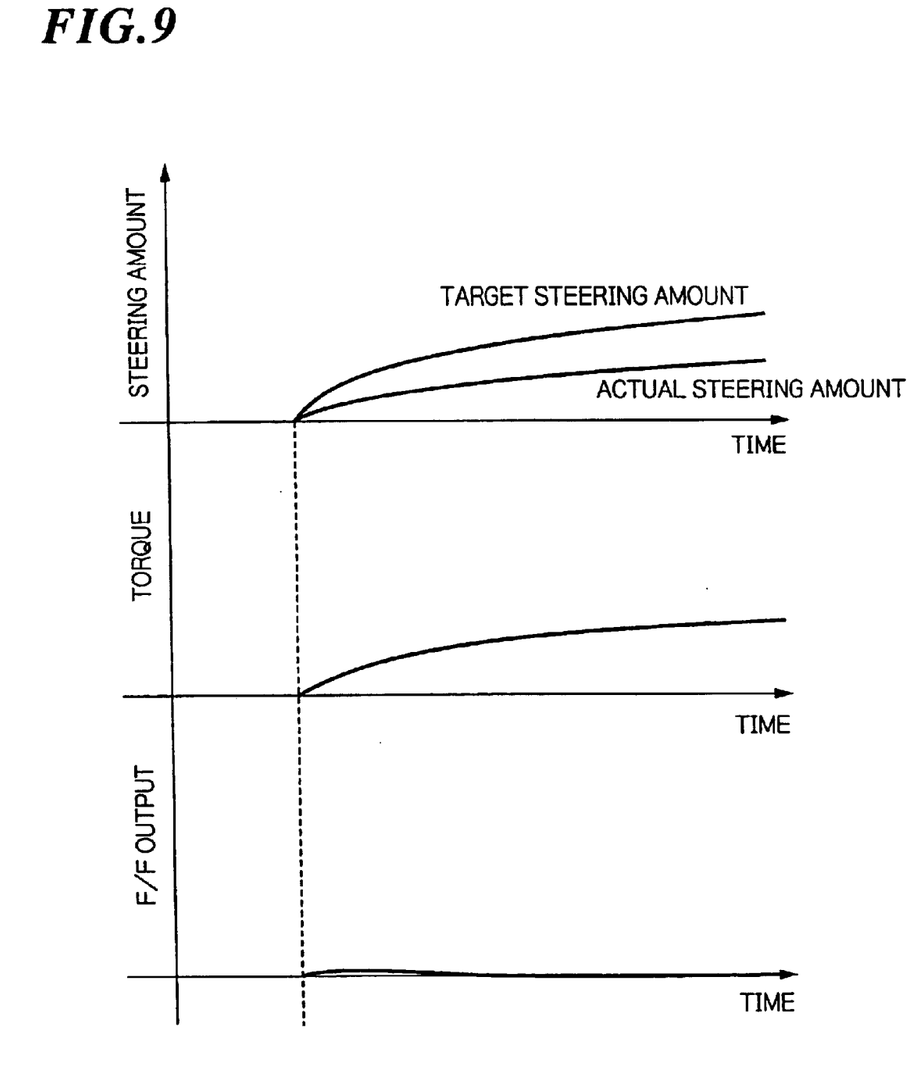
FIG. 9 is a transitional characteristic diagram at the time when slow steering is performed on a high $\mu$ road with the steering apparatus for a vehicle according to the above embodiment.
Figure 10:
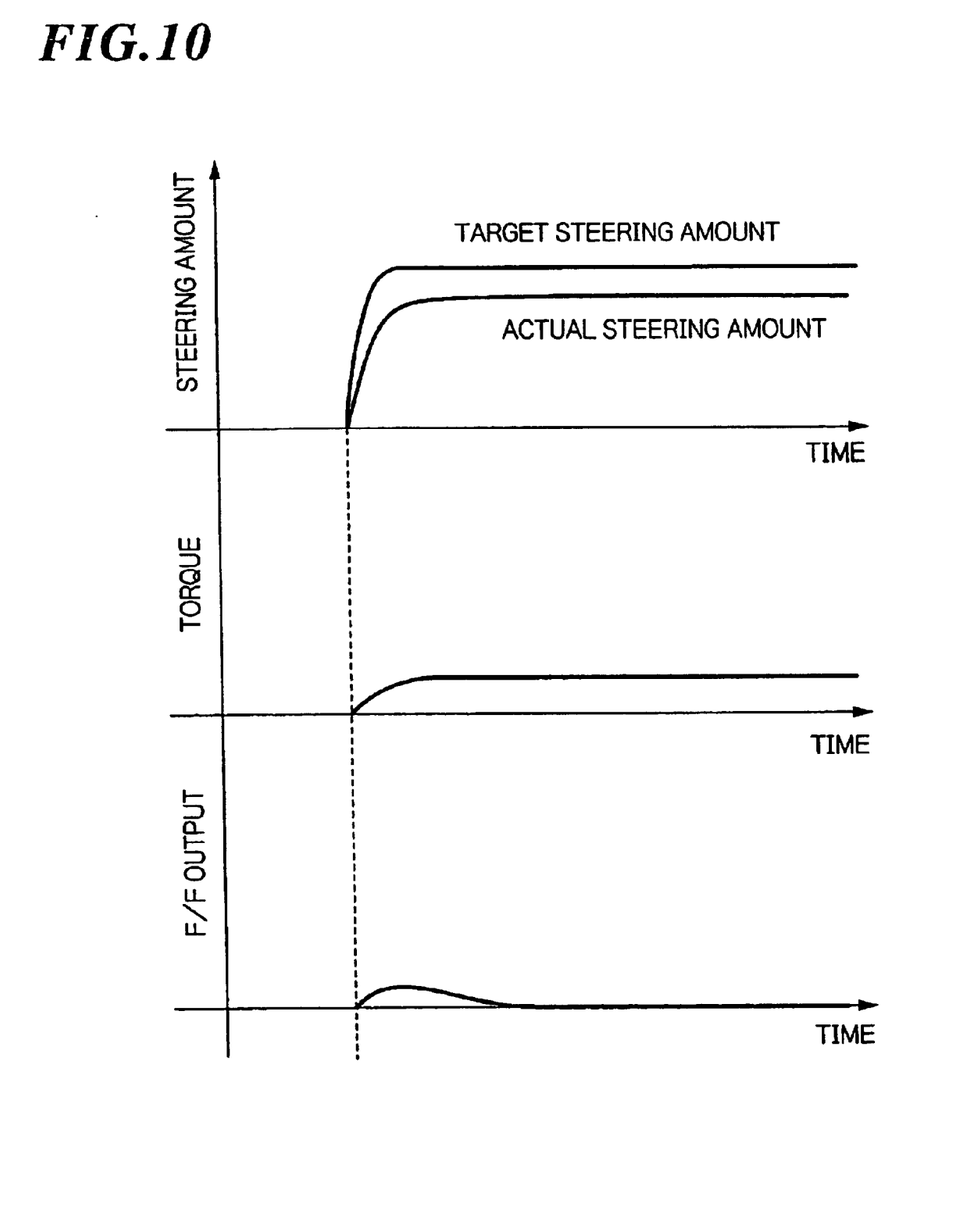
FIG. 10 is a transitional characteristic diagram at the time when steering is performed on a low $\mu$ road with the steering apparatus for a vehicle according to the above embodiment.

Next, the steering operation of this steering apparatus when mounted on a vehicle will be described with reference to FIGS. 8 to 10.

Suppose now that the control of steering is set on the stable side, and, as shown in FIG. 6, the variable integral control device 34 sets the integral gain Gi to be smaller for a low μ road than for a high μ road so that the steady-state deviation is large and the steering stability is improved. Furthermore, suppose that the FF gain characteristic of the band-pass filter 38, as shown in FIG. 7, is set so that the FF gain Gff is made small when the operating frequency is low, and the FF gain Gff is made large when the operating frequency is high.

In the case, for example, the vehicle driver operates the operating lever 11 from the neutral position to the right, at the initial stage of operation, the operating amount of the operating lever 11 is small, but the operating torque applied to the operating lever 11 is large. Here, since the detected torque value Ts is output from the operating torque sensor 15, the FF control device 37 of the steering control section 31 carries out retrieval of a map (not shown) based on the detected torque value Ts to determine the FF control value Fcs for the steering motor 5. By the steering motor 5 being driven based on the FF control value Fcs, the rack axis 7 moves linearly to the right in advance of the full operation of the operating lever 11.

Then, the target rack position setting device 33 sets the target rack position Trs based on the operating amount of the operating lever 11 and calculates the deviation Drs between the target rack position Trs and the actual current rack position Ps. Furthermore, the variable integral control device 34 and the PD control device 35 determines the PID control value Cs based on this deviation Drs, and the steering motor 5 is driven based on the control value Ds synthesized from the PID control value Cs and the FF control value Fcs so as to move the rack axis 7 to the right.

On the other hand, the target operating reaction force setting device 39 calculates the target operating reaction force control value Tms based on the current vehicle speed V and the deviation Drs, and the operating reaction force motor 19 is driven based on this target operating reaction force control value Tms.

The above is an outline of control during steering, and in the present embodiment, owing to the band-pass filter 38 provided, different transitional characteristics are shown in accordance with operating speeds of the operating lever 11.

Rapid Steering on High μ Road

First, a transitional characteristic in the case of rapid steering on a high μ road will be described with reference to FIG. 8.

Because the deviation Drs is large at the initial stage of operation, the operating reaction force control value Tms is set large by the target operating reaction force setting device 39 so that the operating reaction force motor 19 produces a large operating reaction force. Because the operating lever 11 is operated in opposition to this large operating reaction force, the torque value Ts detected by the operating torque sensor 15 becomes large. Furthermore, when rapid steering is being performed, because the operating frequency is high at the initial stage of operation, the FF gain Gff is set large by the band-pass filter 38. As a result, the FF control value Fcs set in the FF control device 37 becomes large, in other words, the FF output becomes large so that control is performed to reduce the deviation Drs. Consequently, at the initial stage of operation when rapid steering is performed on a high μ road, an excellent responsiveness is obtained, thereby enabling the vehicle driver not to feel a delay in steering.

This transitional characteristic at the initial stage of operation corresponds to a compliance steer characteristic, which is determined by the variable integral control device 34 and the PD control device 35. Although the compliance steer characteristic is thus obtained, there may be felt a delay in steering depending on the operation. However, by setting the FF gain Gff by the band-pass filter 38, this steering delay may be eliminated.

Toward the end of operation, because the operating frequency is low, the FF gain Gff is set small by the band-pass filter 38. As a result, the FF control value Fcs that is set in the FF control device 37 becomes small. In other words, the FF output becomes small so that the control to reduce the deviation Drs is restrained. Toward the end of operation, the deviation Drs converges into a steady-state deviation. Thus, even when rapid steering is performed on a high μ road, as the operation approaches its end, a predetermined operating reaction force is maintained, making it possible for the vehicle driver to experience the sensation of good stable steering.

Slow Steering on High μ Road

Next, a transitional characteristic in the case of slow steering on a high μ road will be described with reference to FIG. 9.

Because the deviation Drs is large at the initial stage of operation, the operating reaction force control value Tms is set to be large by the target operating reaction force setting device 39 so that the operating reaction force motor 19 produces a large operating reaction force. Because the operating lever 11 is operated in opposition to this large operating reaction force, the torque value Ts detected by the operating torque sensor 15 becomes large. However, when slow steering is performed, because the operating frequency is low from the initial stage of operation to its end, the FF gain Gff is set to be small by the band-pass filter 38. As a result, the FF control value Fcs set in the FF control device 37 becomes small even at the initial stage of operation, in other words, the FF output becomes small so that the control to reduce the deviation Drs is restrained.

In other words, considering that the operating reaction force becomes large, the actual amount of steering does not become large so that in effect the compliance steering is taken by a large amount. Such control is continued to the end of operation.

Owing to this, the same effect as lowering the actual steering ratio can be produced as compared with when rapid steering is performed, thereby further increasing the steering stability. Consequently, the vehicle driver can have the sensation of good steering stability at a time such as when, for example, slowly changing lanes during high speed running.

Steering on Low μ Road

Next, the transitional characteristic for a low μ road will be described with reference to FIG. 10.

On a low μ road, even with a common vehicle, the tracking performance of actual steering to the steering operation is high, while the reaction force and the road surface information tend to be small. In the present embodiment, however, because the integral gain Gi is set higher for a low μ road than for a high μ road, the deviation Drs becomes larger than it would be naturally, with the result that the target operating reaction force control value Tms set in the target operating reaction force setting device 39 becomes large, and the operating reaction force generated by the operating reaction force motor 19 becomes large as compared with when the integral gain Gi is constant. As a result, notwithstanding the fact that in the case of the integral gain Gi being constant, the absolute value of the steering reaction force should be small so as not to provide the FF control effect, according to the present system, the FF control effect can be expected as with a high μ road.

Consequently, the road surface information and the feeling of steering, which are apt to be lost with a common vehicle in the case of a low μ road, can be felt as in the case of a high μ road.

Thus, according to the steering apparatus for a vehicle of the present embodiment, the operating reaction force is adjusted by the variable integral control device 34 in accordance with the road surface condition (road surface resistance μ), and the integral gain Gi is made smaller for a low μ road than for a high μ road so that the steering stability is improved. Moreover, because the FF effect can be adjusted by the band-pass filter 38 in accordance with the operating frequency, the FF gain Gff can be made larger when the operating frequency is high than when the operating frequency is low, so that the responsiveness is improved. Owing to the above, it becomes possible to make the optimum setting of the operating reaction force by the variable integral control device 34 compatible with the improvement of the responsiveness by the FF control device 37. Furthermore, the transitional characteristic of steering can be set as desired depending on how the FF gain Gff is set.

Note that the present invention is not limited to the embodiment as described above.

For example, the variable integral control device 34 may increase or decrease the integral effect not only according to the road surface condition, but also, in addition to that, according to the yaw rate, transverse acceleration, vehicle speed and the like.

Moreover, the frequency-compensating means is not limited to the band-pass filter, and a low-pass filter may be used in place thereof.

Furthermore, although in the preceding embodiment an example has been described in which the integral gain Gi is made moderate for the high μ road and even smaller for the low μ road by the variable integral control device 34, the integral gain Gi may be varied to other than the above.

Note that the present invention is also applicable to a steering apparatus for a vehicle in which the steering control section 31 does not include an integral control device and performs only proportional control and FF control.

As described hereinabove, according to the present invention, an excellent effect can be attained in that by adjusting the FF effect with the frequency compensating device in accordance with the operating frequency, the responsiveness can be adjusted. Furthermore, an effect is also obtainable that the transitional characteristic of steering can be set as desired depending on how the FF gain is set.

In addition, according to a preferred embodiment of the present invention, an excellent effect can be attained in that because the operating reaction force can be adjusted by adjusting the integral effect with the integral control device in accordance with the road surface condition, the optimum setting of the operating reaction force and the improvement in responsiveness can be made compatible.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering apparatus for a vehicle comprising:

an operating element with which a driver of a vehicle operates the vehicle;

an operating amount detecting device that detects an operating amount of said operating element;

a reaction force imparting device that imparts to said operating element an operating reaction force in opposition to an operating direction of said operating element;

a steering device that steers a steered wheel of said vehicle through a rack axis, said steering device being mechanically separated from said operating element;

a steered amount detecting device that detects a steered amount of said steered wheel;

a target rack position setting device that sets a target rack position of said rack axis based on the operating amount detected by said operating amount detecting device; and a control device that determines a control amount for said reaction force imparting device and a control amount for said steering device in accordance with a deviation between the target rack position set by said target rack position setting device and the steered amount detected by said steered amount detecting device, wherein said steering apparatus for a vehicle further comprises an operating torque detecting device that detects an operating torque acting on said operating element, and said control device comprises a feedforward control device that feedforward-controls said steering device in accordance with the operating torque detected by said operating torque detecting device; and a frequency compensating device that increases or decreases a feedforward effect in accordance with an operating frequency of said operating element.

2. The steering apparatus for a vehicle according to claim 1, wherein said control device further comprises an integral control device that increases or decreases an integral effect in control of said steering device in accordance with at least a road surface condition.

3. The steering apparatus for a vehicle according to claim 2, wherein said control device further comprises a proportional and differential control device that cooperates with said integral control device to provide a proportional, integral and differential control value for said steering device.

4. The steering apparatus for a vehicle according to claim 1, wherein said feedforward control device calculates a feedforward control value for feedforward-controlling said steering device by multiplying an original feedforward control value that is determined based on a map of the operating torque detected by said operating torque detecting device and a drive amount of said steering motor, by a feedforward gain set by said frequency compensating device.

5. The steering apparatus for a vehicle according to claim 2, wherein said control device further comprises a proportional and differential control device that cooperates with said integral control device to provide a proportional, integral and differential control value for said steering device, wherein said feedforward control device calculates a feedforward control value for feedforward-controlling said steering device by multiplying an original feedforward control value that is determined based on a map of the operating torque detected by said operating torque detecting device and a drive amount of said steering motor, by a feedforward gain set by said frequency compensating device, and wherein said proportional, integral and differential control value and said feedforward control value are synthesized to control a drive current for said steering motor.

* * * * *